P. H. LECKINGER.
RIVETING HAMMER.
APPLICATION FILED JULY 5, 1913.
1,173,525.
Patented Feb. 29, 1916.
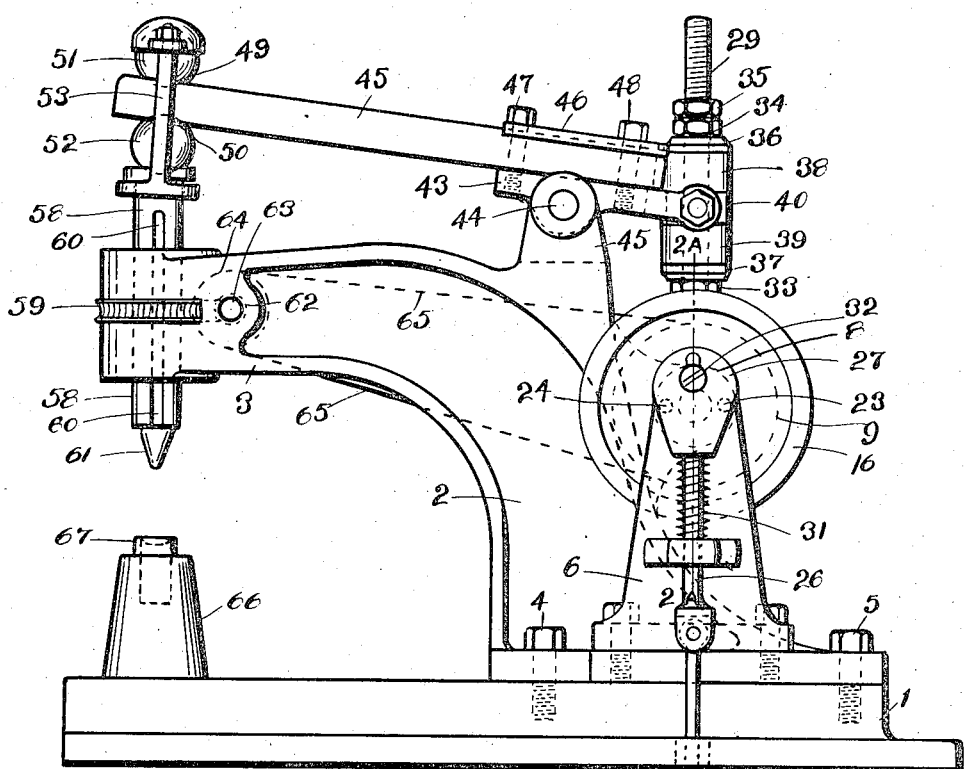
Fig. 1.
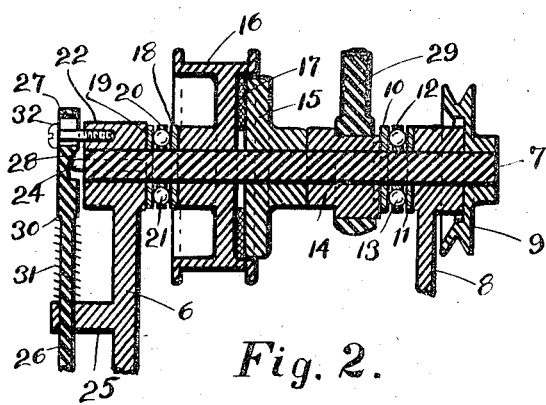
Fig. 2.
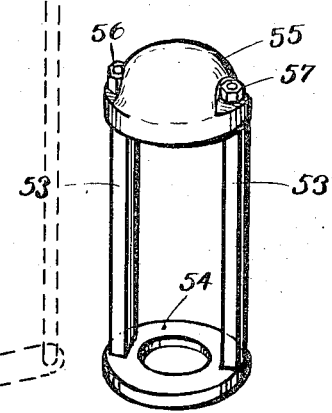
Fig. 3.
Fig. 4.
WITNESSES:
Arthur B. Norris.
Eric Ischinger.
INVENTOR.
Philip H. Leckinger
BY
Frank Keifer
ATTORNEY.

UNITED STATES PATENT OFFICE.

PHILIP H. LECKINGER, OF ROCHESTER, NEW YORK.

RIVETING-HAMMER.

1,173,525.  Specification of Letters Patent.  Patented Feb. 29, 1916.

Application filed July 5, 1913. Serial No. 777,504.

*To all whom it may concern:*

Be it known that I, PHILIP H. LECKINGER, a citizen of the United States, residing at Rochester, in the county of Monroe and State of New York, have invented certain new and useful Improvements in Riveting-Hammers, of which the following is a specification.

The object of this invention is to provide a new and improved riveting hammer.

Another object of this invention is to drive the hammer so that a variable force may be delivered without varying the power delivered to the driving shaft of the hammer.

Another object of the invention is to build a hammer with an elastic structure so as to cause it to deliver an elastic blow.

Another object of the invention is to rotate the hammer peen so as to cause it to polish the rivet head at the same time that it is forming it.

These and other objects of the invention will be fully illustrated in the drawings, described in the specification and pointed out in the claims at the end thereof.

In the accompanying drawings, Figure 1 is a side elevation of my improved hammer. Fig. 2 is a cross section on the line 2ª—2ª of Fig. 1. Fig. 3 is a perspective view of the yoke for connecting the hammer peen with the lever or helve of the hammer. Fig. 4 is a vertical section through the buffers 38 and 39 and the parts associated therewith on the eccentric rod 29.

In the accompanying drawings like reference numerals indicate like parts.

In Fig. 1 reference numeral 1 indicates the base of my improved hammer. 2 indicates the frame of the machine having an overhanging arm 3, which frame is fastened to the base by bolts 4 and 5. 6 is a bracket used for supporting the main or power shaft 7 of the machine at one end. 8 is a bracket on the frame 2 which furnishes a bearing for the shaft 7 at the other end. The shaft 7 is mounted to rotate in the bearings provided in the brackets 6 and 8 heretofore described.

As shown in Fig. 2 the shaft 7 has keyed thereto a grooved pulley 9 which pulley is placed outside of the bracket 8. On the shaft 7 is a ball thrust bearing comprising the washers 10 and 11, which are preferably hardened, the ball retaining ring 12 and the balls 13 which are carried in the pockets of the ball retaining ring. The washers 10 and 11 and the ball retaining ring 12 are loose in the shaft and are free to rotate independently thereof.

Keyed to the shaft is the eccentric sleeve 14. Next to the eccentric sleeve is the friction disk 15 which is also keyed to the shaft. Next is the flanged driving pulley 16 loosely mounted to turn on the shaft between which and the friction disk 15 is placed a leather washer 17. Next to the flanged pulley 16 is placed the ball bearing having the washers 18 and 19 and the ball retaining ring 20 and the balls 21, the ball bearing being similar in all details to that already described. The bearing 22 on the bracket 6 is perforated on either side of the bearing for the shaft 7 and receives two pins therein 23 and 24 which are mounted to slide in the perforations.

The bracket 6 has a lug 25 thereon which is perforated and in which is adapted to slide the rod 26, having a cam plate 27 connected to the upper end thereof. This plate has a cam 28 cut in its inner surface which cam engages with the pins 23 and 24 for the purpose of pushing them in. The opposite ends of the pins 23 and 24 engage with the washer 19 causing the washer and the remaining parts of the ball-bearing together with the flange pulley 16 to move into frictional contact with the friction disk 15 causing the disk 15 to rotate with the flanged pulley 16. This in turn rotates the shaft and the eccentric sleeve 14 causing the reciprocation of the eccentric rod 29 fastened to the eccentric.

The plate 27 forms a shoulder 30 with a rod 26 between which shoulder and the lug 25 a helical spring 31 is placed surrounding the rod 26. The expansion of this spring normally lifts the plate 27 so as to release the pins 23 and 24. The upper end of the plate is guided by a screw 32 which engages with the slot in the plate. To the lower end of the rod 26 is connected a treadle in any suitable manner by which the rod 26 may be drawn down. The eccentric rod 29 is threaded to receive the nuts 33, 34 and 35 between which nuts are clamped the cup washers 36 and 37 between which are received the rubber buffers 38 and 39 between which in turn is clamped the plate 40, which plate is circular and has a flange at the top and the bottom thereof. At points diametrically opposite each other are cut in the plate the recesses 41 and 42 with which engage suitable pins or screws carried in the yoke at the end of the rocker plate 43. This rocker plate 43 has bearings on the opposite side thereof which engage with the bearing pin 44 carried in the lug 45 on the frame 2.

Clamped to the rocker plate 43 is the helve 45 by means of a plate 46 and bolts 47 and 48 which are threaded into the rocker plate 43. At the outer end of the helve 45 are the cup shaped recesses 49 and 50, on either side, which receive the rubber balls 51 and 52, which balls are held in contact with the helve by means of the yoke 53 which yoke has a washer 54 at the bottom and a cap 55 at the top. The upright portion of the yoke is threaded at the top to receive the nuts 56 and 57 by which the cap is held on the yoke.

In assembling the hammer head 58 is first passed through the washer 54, the ball 52 is then put in place in the cup provided therefor in the top of the hammer head. The cup shaped recess 50 in the helve 45 is then brought down on the ball 52. The ball 51 is put in the cup shaped recess 49 and the cap 55 is then placed on the top of the yoke and all the parts are fastened together by the nuts 56 and 57. The hammer head 58 is mounted to slide through the skew gear 59 which has a suitable opening therethrough with a key therein which engages with the groove or keyway 60 in the hammer head which permits the hammer head 58 to reciprocate therein, but which compels both of them to turn together.

On the bottom of the hammer head is provided the peen 61 which may be of various forms for the different kinds of work to be done, which peen has a number seven tapered fit with a suitable conical recess in the hammer head so as to make sufficiently positive engagement therewith permitting the change of peens for the different classes of work to be done.

The skew gear 59 is driven by a worm 62 carried on the shaft 63 on which shaft is carried the driving pulley 64 which is driven from the pulley 9 by the belt 65. On the base is mounted the anvil 66 having a block 67 therein to hold the work during the operation of the hammer. This block 67 is made interchangeable so that different ones may be used.

I claim:

1. A riveting machine comprising a frame, a helve pivoted to the frame, a hammer guided on the frame and having its upper end rotatably connected to the helve, a rotary member journaled on the frame and through which the hammer is guided at a point below its connection with the helve, a drive shaft, driving connection between the drive shaft and the helve, and driving connection between the rotary member and the drive shaft.

2. A riveting machine comprising an overhanging arm having a guide at its free end, a hammer movable axially in engagement with said guide, a rotary member mounted on the arm and through which the hammer extends, a slot and key connection between the rotary member and the hammer permitting the hammer to move axially in said member but causing the hammer to rotate with said member, means for rotating the rotary member, a helve pivotally mounted between its ends on the arm, means for operating the helve simultaneously with the rotation of the rotary member, and a resilient connection between the upper end of the hammer and the helve, said connection being located entirely above the rotary member and having provision permitting the rotation of the hammer relatively to the helve.

3. A riveting machine comprising a hammer, a helve pivoted between its ends and having the hammer connected to one end thereof, a reciprocating rod, a member guided on said rod and pivotally connected to the other end of the helve, and elastic buffers arranged on said rod on opposite sides of the said member.

4. A riveting machine comprising a hammer, a helve, mechanism for rotating the hammer, and a connection between the hammer and the helve embodying a yoke in which the hammer is rotatable and a cushion interposed between the upper end of the hammer and the helve.

5. A riveting machine comprising a hammer, mechanism for rotating the hammer connected to the latter at a point between the ends of the hammer, a pivoted helve, and a resilient connection between said helve and the hammer on one side of the point where the rotating means connects with the hammer, said connection having provision permitting the hammer to rotate relatively to the helve.

6. A riveting machine comprising a pivoted helve, a hammer, a resilient member interposed between one end of the hammer and the helve, and means connecting the hammer with the helve, said means having a bearing in which the hammer turns below said resilient member, and means acting directly on the hammer to turn the latter in the bearing without turning the connecting means.

7. A riveting machine comprising a pivoted helve, a hammer provided with an annular shoulder, a resilient member interposed between said hammer and the helve above the annular shoulder, means connecting the hammer with the helve, said means engaging beneath the annular shoulder to permit the hammer to turn relatively to said connecting means, and means acting directly on the hammer to turn the latter in the bearing without turning the connecting means.

8. A riveting machine comprising a hammer, means for rotating the hammer, a helve, means for rocking the helve, the opposed faces of the hammer and the helve being provided with cups, a rubber ball fitting said cups between the hammer and the helve, and means connecting said hammer and helve to permit the rocking of the helve and the rotation of the hammer.

9. A riveting machine comprising a reciprocating hammer, means for rotating the hammer, a helve, means for rocking the helve, a yoke having a resilient connection with the helve and connected to the hammer to permit the latter to rotate therein, and a resilient connection between the hammer and the helve permitting the hammer to rotate.

10. A riveting machine comprising a reciprocating hammer, means for rotating the same, a helve, means for rocking the same, a yoke in which the hammer is mounted to rotate, a rubber ball interposed between said yoke and the upper face of the helve and a rubber ball interposed between the under face of the helve and the upper end of the hammer.

11. A riveting machine comprising a hammer, mechanism for reciprocating the hammer, a mechanism for rotating the hammer embodying a worm wheel through which the hammer is guided, and a worm meshing with the worm wheel, whereby the hammer is positively held in its rotated position.

12. In a riveting machine, the combination of a frame having bearings, a normally idle shaft mounted to rotate in said bearings, means for driving said shaft intermittently, an eccentric on said shaft, an eccentric rod reciprocated by said eccentric, washers on said eccentric rod, elastic buffers adjacent to each of said washers, a plate interposed between said elastic buffers, nuts on said rod for holding all of said parts together and adjusting the elasticity thereof.

13. In a riveting machine, the combination of a frame having bearings, a normally idle shaft mounted to rotate in said bearings, means for driving said shaft intermittently, an eccentric on said shaft, an eccentric rod reciprocated by said eccentric, washers on said eccentric rod, elastic buffers adjacent to each of said washers, a plate interposed between said elastic buffers, nuts on said rod for holding all of said parts together and adjusting the elasticity thereof, a helve pivotally mounted on the frame of said machine and pivotally connected to the plate between the elastic buffers.

14. In a riveting machine, the combination of a helve pivotally mounted, a reciprocating device mounted in said machine, a plate on said reciprocating device to which said helve is connected, elastic buffers on said reciprocating device on each side of said plate, means for clamping said plate and said buffers together.

In testimony whereof I affix my signature in presence of two witnesses.

PHILIP H. LECKINGER.

Witnesses:
BEN FREEDMAN,
ISADORE RUBIN.